H. L. HOYBOOK.
SUPPORT FOR TELEGRAPH AND TELEPHONE WIRES.
APPLICATION FILED FEB. 1, 1912.
1,078,201. Patented Nov. 11, 1913.
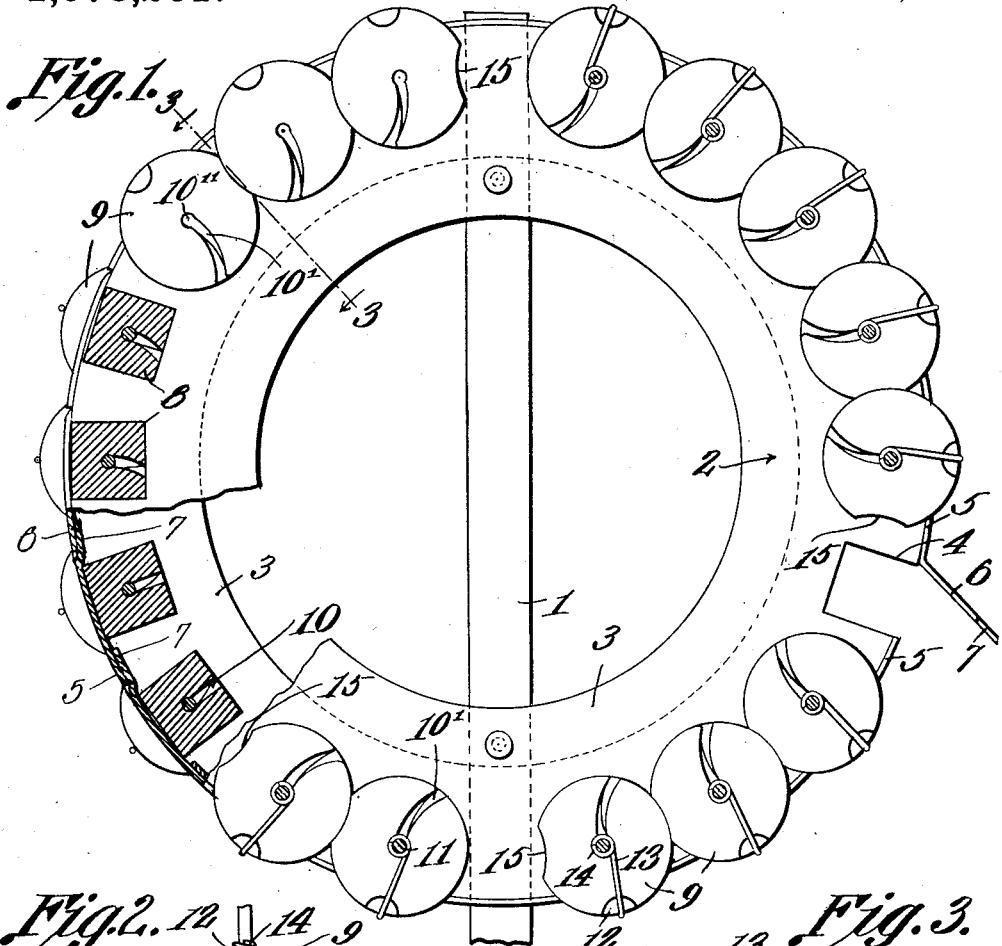
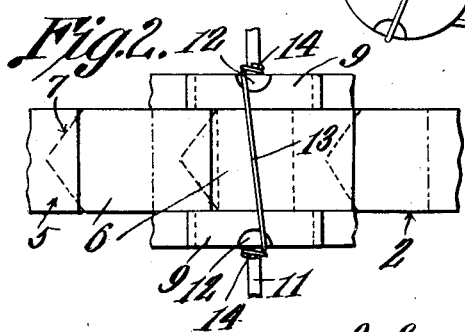
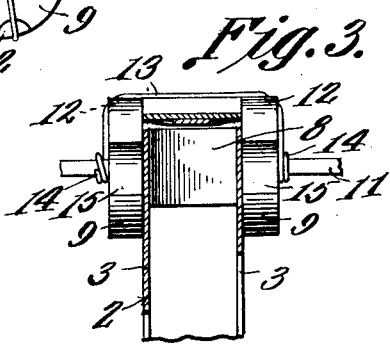
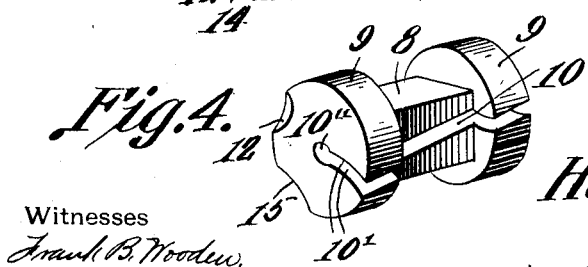
Witnesses
Henry L. Hoybook,
Inventor
by C. A. Snow & Co.
Attorneys

UNITED STATES PATENT OFFICE.

HENRY LEVID HOYBOOK, OF TYLER, TEXAS.

SUPPORT FOR TELEGRAPH AND TELEPHONE WIRES.

1,078,201. Specification of Letters Patent. Patented Nov. 11, 1913.

Application filed February 1, 1912. Serial No. 674,815.

*To all whom it may concern:*

Be it known that I, HENRY L. HOYBOOK, a citizen of the United States, residing at Tyler, in the county of Smith and State of Texas, have invented a new and useful Support for Telegraph and Telephone Wires, of which the following is a specification.

The present invention relates to improvements in supports for telegraph and telephone wires, the primary object of the invention being the provision of a novel form of support, whereby a plurality of insulators or wire carrying members are detachably retained in spaced relation, said support being preferably made circular in form so that the greatest possible number of wires may be strung and held thereby.

A further object of the present invention is the provision of a metal support made in the form of a circle and provided with a plurality of insulator supporting recesses, whereby the insulators carrying the telephone and telegraph wires are readily inserted and secured in place, the support and insulators providing a means whereby the wires are strung and retained in proper separated and spaced relation.

With the foregoing and other objects in view which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the drawings Figure 1 is a front elevation of the complete support, with portions thereof broken away to show the construction and the positioning of the wire carrying insulators therein. Fig. 2 is an elevation of a portion of the support with one of the insulators in place. Fig. 3 is a section taken on line 3—3 of Fig. 1. Fig. 4 is a perspective view of one of the insulators.

Referring to the drawings, the numeral 1 designates the pole which carries the insulator support 2, which is made in the form of an open ring and is composed of the two metal plates or flanges 3 which provide and are each provided with the rectangular recesses 4 opening at the periphery of the support 2. The plates or flanges 3 are connected at equi-distant points throughout their circumference by means of the bridging portion 5 of the flexible strips of metal which constitute as shown, the fixed portion 5, and the resilient terminals 6 terminating in the pointed end 7. A plurality of insulator pockets or receptacles are thus provided, said pockets being open peripherally, so that the insulator members may be readily inserted therein. In order to provide a sealing means for the alined recesses 4, a plurality of bridging plates 5 are connected to the flanges 3 at the portions between the respective alined recesses 4, so that the flexible flaps 6 of each bridging plate 5 may be moved to fit above the rectangular portion 8 of the insulator member and have its reduced end 7 projected below the end of the adjacent bridged plate 5 and thus hold the insulator in place, as clearly illustrated in Figs. 1 and 2. As the flap 6 is made of flexible metal, the same may be readily bent to assume the full and dotted positions as shown in Fig. 2 and thus hold the insulators properly seated within its recess. Each insulating member is provided with the disk ends 9, which as shown, are disposed to abut the outer faces of the respective flanges or plates 3 and provide a means to retain the insulators against longitudinal movement when in wire supporting position. Each of the insulators is provided with the slot 10, which is formed longitudinally through the respective disks 9 and the main connecting portion 8, the same being provided with the curved walls as at 10', so that the telephone or telegraph wire 11 may be slid into said slot and will be normally held therein against movement by means of the curved portions 10' which provide shoulders at 10'' to prevent the accidental displacement of the wire 11. In order however to lock the said wire against movement when seated within the insulators, the recessed portions 12 are formed upon the outer ends of the respective disks 9 and a binding or retaining wire 13 is positioned as shown clearly in Figs. 1, 2 and 3, having its terminals 14 connected to the wire or conductor 11 upon the outer faces of the respective disks 9. By this means it is evident that the retaining wire 13 holds the wire 11 seated within the concentric bore of the slot 10 of the respective insulators.

In order that the respective insulators may be seated against rotation, one in each of the respective recesses or pockets 4 as clearly shown in Fig. 1, the said pockets are formed non-circular in shape, while the engaging portions of the line wire carrying members are similarly shaped to prevent the rotation thereof when in the support.

In using the present invention in stringing the telephone and telegraph wires, the respective closures 6 are bent back as illustrated at the right as viewed in Fig. 1, so that after the wire has been seated within the respective slots of the insulators and retained therein by means of the retaining wire 13, the said insulator is then slid so that the rectangular portion 8 fits within the pocket 4 spanning both of the respective plates 3 of the support 2, after which the said closure 6 is bent downwardly and the reduced end 7 is guided below the edge of the adjacent plate 5, thus locking the insulator within the pocket 4 so that the conductor wires 11 are properly held and supported in the desired spaced relation, and are yet permitted the desired longitudinal expansion and contraction due to the changes of temperature.

The central portions of the insulators and the pockets in the support to receive them, are preferably made square, but any non-circular form that will prevent the rotation of the insulation within its respective pocket will operate effectively.

What is claimed is:

1. A line wire carrying insulator support, including two disks, the peripheral edges of which are provided with angular slots arranged in alined pairs, bridging pieces connecting the disks at their peripheries and at the portions of the edges between the slots, and closures for the spaces between the bridging pieces to seal the outer ends of the pockets formed by the alined pairs of slots and the space between the bridging pieces.

2. A line wire carrying insulator support, including two disks, the peripheral edges of which are provided with angular slots arranged in alined pairs, bridging pieces connecting the disks at their peripheries and at the portions of the edges between the slots, and a flexible tongue extending from one edge of each bridging member and disposed to engage the opposite edge to seal the space between the bridging members and form a closure for the receptacle formed by the alined pairs of slots of the disks and the space between the bridging pieces.

3. A line wire carrying insulator support, including two disks, the peripheral edges of which are provided with angular slots arranged in alined pairs, bridging pieces connecting the disks at their peripheries and at the portions of the edges between the slots, and a flexible tongue extending from one edge of each bridging piece and disposed to engage the opposite edge to seal the space between the bridging members and form a closure for the receptacle formed by the alined pairs of slots of the disks and the space between the bridging pieces, the free terminal of said closure being tapered for introduction between the disks and within the bridging piece.

4. An insulator support, including two disks, the peripheral edges of which are provided with angular slots arranged in alined pairs, bridging pieces connected to the peripheral edges of the disks and each having a yieldable free terminal disposed to fit between the disks and form a closure for alined pairs of recesses, said closure when in such sealing position being in substantially the same circumferential line as the peripheries of the disk.

5. A line wire supporting device, comprising an annular member provided with a plurality of peripherally disposed outwardly opening angular pockets, a line wire carrying member insertible through the opening of each pocket, and means connected to the annular member for retaining the line wire carrying member in its pocket.

6. A line wire supporting device, comprising an annular member provided with a plurality of peripherally disposed outwardly opening angular pockets, a line wire carrying member having a correspondingly shaped body portion insertible through the openings of each pocket, the engagement of the walls of the pockets with the line wire carrying member retaining such member against rotation, and a closure for each pocket to maintain the line wire carrying member within the pocket and against outward movement.

In testimony that I claim the foregoing as my own, I have hereto affixed my signature in the presence of two witnesses.

HENRY LEVID HOYBOOK.

Witnesses:
A. C. L. HILL,
M. H. NICHOLSON.

---

Copies of this patent may be obtained for five cents each, by addressing the "Commissioner of Patents, Washington, D. C."